(12) United States Patent
Shao et al.

(10) Patent No.: US 11,743,599 B2
(45) Date of Patent: Aug. 29, 2023

(54) SYSTEMS AND METHODS FOR AUTOMATICALLY ADJUSTING APERTURE OF A CAMERA

(71) Applicant: ZHEJIANG DAHUA TECHNOLOGY CO., LTD., Zhejiang (CN)

(72) Inventors: Yiyi Shao, Hangzhou (CN); Erli Lu, Hangzhou (CN); Mingzhu Chen, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 43 days.

(21) Appl. No.: 17/446,474

(22) Filed: Aug. 31, 2021

(65) Prior Publication Data

US 2021/0392257 A1 Dec. 16, 2021

Related U.S. Application Data

(63) Continuation of application No. PCT/CN2019/114581, filed on Oct. 31, 2019.

(30) Foreign Application Priority Data

Apr. 18, 2019 (CN) .................. 201910314040.6

(51) Int. Cl.
*H04N 23/75* (2023.01)
*H04N 23/60* (2023.01)
*H04N 23/73* (2023.01)

(52) U.S. Cl.
CPC ............ *H04N 23/75* (2023.01); *H04N 23/64* (2023.01); *H04N 23/73* (2023.01)

(58) Field of Classification Search
CPC .. H04N 5/238; H04N 5/23222; H04N 5/2353; H04N 5/243; H04N 5/235; H04N 5/2351
See application file for complete search history.

(56) References Cited

U.S. PATENT DOCUMENTS

| 8,558,936 B2 * | 10/2013 | Nomura ............... H04N 5/2257 396/290 |
| 10,104,308 B2 | 10/2018 | Nakaoka |

(Continued)

FOREIGN PATENT DOCUMENTS

| CN | 101945220 A | 1/2011 |
| CN | 102135700 A | 7/2011 |

(Continued)

OTHER PUBLICATIONS

The Extended European Search Report in European Application No. 19924679.4 dated Feb. 11, 2022, 8 pages.

(Continued)

*Primary Examiner* — Ahmed A Berhan
(74) *Attorney, Agent, or Firm* — Metis IP LLC

(57) ABSTRACT

The present disclosure relates to systems and methods for automatically adjusting an aperture of a camera. The methods may include obtaining at least two parameters out of three parameters of the camera, the three parameters including a luminance parameter, an exposure parameter, and a focal length parameter; determining a step length of the aperture based on the at least two parameters; and automatically adjusting the aperture of the camera based on the step length.

19 Claims, 12 Drawing Sheets

(56) References Cited

U.S. PATENT DOCUMENTS

| | | |
|---|---|---|
| 2006/0291847 A1 | 12/2006 | Terada |
| 2008/0309792 A1 | 12/2008 | Takagi et al. |
| 2009/0180771 A1 | 7/2009 | Liu et al. |
| 2012/0154681 A1 | 6/2012 | Morimoto |
| 2013/0093945 A1 | 4/2013 | Okamoto et al. |
| 2013/0286235 A1 | 10/2013 | Matsumoto et al. |
| 2014/0176682 A1 | 6/2014 | Iwasaki |
| 2015/0286112 A1 | 10/2015 | Inoue et al. |
| 2016/0105595 A1 | 4/2016 | Huang et al. |
| 2017/0212408 A1 | 7/2017 | Ma et al. |
| 2018/0035034 A1* | 2/2018 | Nakata .................. H04N 5/238 |
| 2018/0270425 A1 | 9/2018 | Li et al. |

FOREIGN PATENT DOCUMENTS

| | | |
|---|---|---|
| CN | 105242481 A | 1/2016 |
| CN | 103338235 A | 2/2016 |
| CN | 105554408 A | 5/2016 |
| CN | 105872398 A | 8/2016 |
| CN | 106027914 A | 10/2016 |
| CN | 104661008 B | 10/2017 |
| CN | 108681182 A | 10/2018 |
| WO | 2020211328 A1 | 10/2020 |

OTHER PUBLICATIONS

Internnational Search Report in PCT/CN2019/114581 dated Feb. 12, 2020, 4 pages.

Written Opinion in PCT/CN2019/114581 dated Feb. 12, 2020, 6 pages.

First Office Action in Chinese Application No. 201910314040.6 dated Dec. 20, 2019, 19 pages.

* cited by examiner

900

```
┌─────────────────────────────────────────────────┐
│ Obtaining a three-dimensional table including the│
│  luminance parameter, the exposure parameter,    │ ~ 910
│ and the focal length parameter as three coordinate│
│      axes of the three-dimensional table         │
└─────────────────────────────────────────────────┘
                        ↓
┌─────────────────────────────────────────────────┐
│  Determining the step length based on the three- │ ~ 920
│              dimensional table                   │
└─────────────────────────────────────────────────┘
```

FIG. 9

Relationships between an aperture and a luminance under the same shutter speed, the same gain, and different zoom times (or different focal ranges)

Relationships between an aperture and a luminance under different shutter speeds, different gains, and the same zoom times (or the same focal range)

SYSTEMS AND METHODS FOR AUTOMATICALLY ADJUSTING APERTURE OF A CAMERA

CROSS-REFERENCE TO RELATED APPLICATIONS

This application is a Continuation of International Application No. PCT/CN2019/114581, filed on Oct. 31, 2019, which claims priority of Chinese Application No. 201910314040.6, filed on Apr. 18, 2019, the contents of which are incorporated herein in its entirety by reference.

TECHNICAL FIELD

The present disclosure generally relates to systems and methods for video surveillance, and more particularly, to systems and methods for automatically adjusting an aperture of a camera.

BACKGROUND

With the developments of video surveillance and surveillance cameras, camera lenses with adjustable aperture and/or adjustable focal length are widely used due to superior adaptability to different scenarios. Existing methods for adjusting or controlling the aperture of a camera usually relies on adjusting the aperture based only on a difference between a current luminance and a target luminance of the camera, or only on a focal range of the camera. However, luminance differences caused by adjusting the aperture per adjustment unit are different under different shutter speeds, different gains, and different focal ranges. For example, under a same focal range, if a step length that is appropriate for a lower shutter speed and a lower gain is used for adjusting the aperture of a camera with a higher shutter speed and a higher gain, the aperture will be set excessively large. Also, under the same shutter speed and the same gain, if a step length that is appropriate for a longer focal range is used for adjusting the aperture of the camera with a shorter focal range, the aperture will be set excessively large. Thus, it is desirable to provide systems and methods for automatically adjusting or controlling an aperture of a camera efficiently and correctly to improve the image quality of the camera.

SUMMARY

An aspect of the present disclosure introduces a system for automatically adjusting an aperture of a camera. The system may include at least one storage medium including a set of instructions for automatically adjusting the aperture of the camera, and at least one processor in communication with the storage medium. When executing the set of instructions, the at least one processor may perform the following operations. The at least one processor may obtain at least two parameters out of three parameters of the camera, the three parameters including a luminance parameter, an exposure parameter, and a focal length parameter; determine a step length of the aperture based on the at least two parameters; and automatically adjust the aperture of the camera based on the step length.

In some embodiments, the at least one processor may further obtain a current luminance of the camera; obtain a target luminance of the camera; and determine the luminance parameter based on the current luminance and the target luminance.

In some embodiments, the at least one processor may further obtain a current shutter speed of the camera; obtain a current gain of the camera; obtain a maximum shutter speed of the camera; obtain a maximum gain of the camera; and determine the exposure parameter based on the current shutter speed, the current gain, the maximum shutter speed, and the maximum gain.

In some embodiments, the at least one processor may further obtain a current focal range of the camera; obtain a focal range at a telephoto end of the camera; and determine the focal length parameter based on the current focal range and the focal range at the telephoto end.

In some embodiments, to determine the step length of the aperture, the at least one processor may further determine the step length based on the luminance parameter, the exposure parameter, and the focal length parameter according to D=

$$k \times \frac{\alpha \times \gamma}{\beta},$$

wherein D denotes the step length, k denotes a coefficient, α denotes the luminance parameter, β denotes the exposure parameter, and γ denotes the focal length parameter.

In some embodiments, to determine the step length of the aperture, the at least one processor may further determine the step length based on the luminance parameter and the exposure parameter according to $$D = k \times \frac{\alpha}{\beta},$$

wherein D denotes the step length, k denotes a coefficient, α denotes the luminance parameter, and β denotes the exposure parameter.

In some embodiments, to determine the step length of the aperture, the at least one processor may further determine the step length based on the luminance parameter and the focal length parameter according to D=k×α×γ, wherein D denotes the step length, k denotes a coefficient, α denotes the luminance parameter, and γ denotes the focal length parameter.

In some embodiments, to determine the step length of the aperture, the at least one processor may further determine the step length based on the exposure parameter and the focal length parameter according to $$D = k \times \frac{\gamma}{\beta},$$

wherein D denotes the step length, k denotes a coefficient, β denotes the exposure parameter, and γ denotes the focal length parameter.

In some embodiments, to determine the step length of the aperture, the at least one processor may further obtain a three-dimensional table including the luminance parameter, the exposure parameter, and the focal length parameter as three coordinate axes of the three-dimensional table; and determine the step length based on the three-dimensional table.

In some embodiments, to determine the step length of the aperture, the at least one processor may further determine whether an absolute difference between a current luminance and a target luminance of the camera is greater than a luminance threshold; and in response to a determination that the absolute difference is greater than the luminance threshold, determine the step length of the aperture.

According to another aspect of the present disclosure, a method for automatically adjusting an aperture of a camera is provided. The method may include obtaining at least two parameters out of three parameters of the camera, the three parameters including a luminance parameter, an exposure parameter, and a focal length parameter; determining a step length of the aperture based on the at least two parameters; and automatically adjusting the aperture of the camera based on the step length.

According to still another aspect of the present disclosure, a non-transitory computer-readable medium, comprising at least one set of instructions compatible for automatically adjusting an aperture of a camera, is provided. When executed by at least one processor of an electrical device, the at least one set of instructions may direct the at least one processor to perform the following operations. The at least one processor may obtain at least two parameters out of three parameters of the camera, the three parameters including a luminance parameter, an exposure parameter, and a focal length parameter; determine a step length of the aperture based on the at least two parameters; and automatically adjust the aperture of the camera based on the step length.

According to still another aspect of the present disclosure, a system for automatically adjusting an aperture of a camera is provided. The system may include a parameter obtaining module, configured to obtain at least two parameters out of three parameters of the camera, the three parameters including a luminance parameter, an exposure parameter, and a focal length parameter; a step length determining module, configured to determine a step length of the aperture based on the at least two parameters; and an automatically adjusting module, configured to automatically adjust the aperture of the camera based on the step length.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 9 is a flowchart illustrating an exemplary process for determining a step length of an aperture according to some embodiments of the present disclosure;

DETAILED DESCRIPTION

Figure 1:
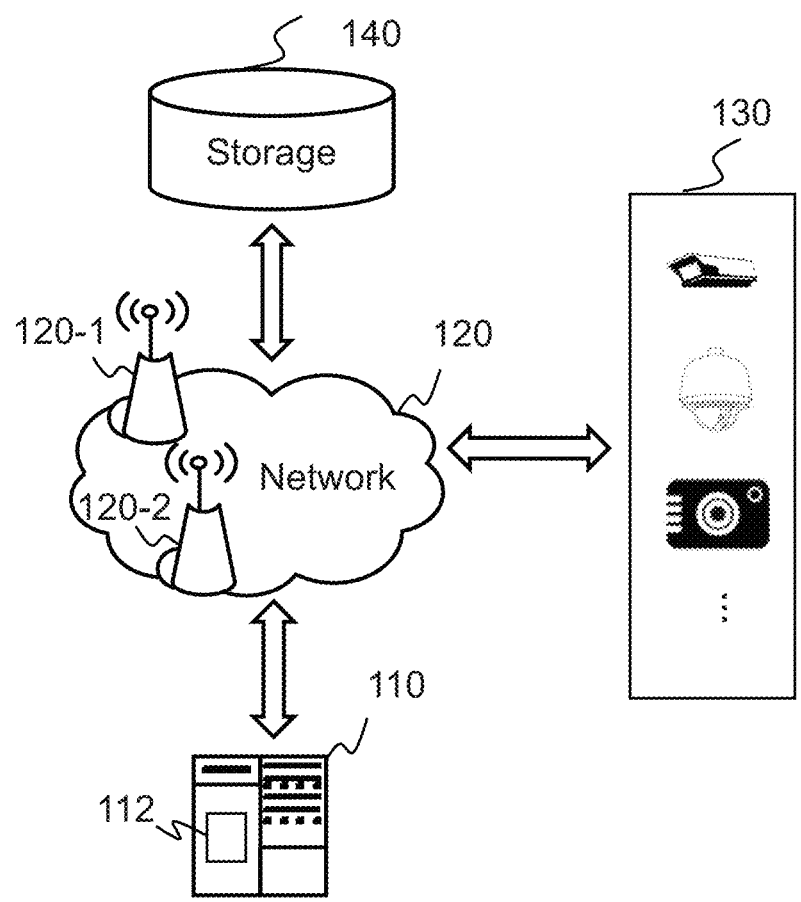
FIG. 1 is a schematic diagram illustrating an exemplary system for automatically adjusting an aperture of a camera according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) is for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for automatically adjusting an aperture of a camera. To this end, the systems and methods may use at least two parameters from three parameters of the camera to calculate a step length that the aperture of the camera will be adjusted. The three parameters may include a luminance parameter associated with a current luminance and a target luminance of the camera, an exposure parameter associated with shutter speeds and gains of the camera, a focal length parameter associated with a current focal range and a focal range at a telephoto end of the camera. The combination of the at least two parameters will adjust the aperture according to a real-time condition of the camera. In this way, the aperture will be automatically adjusted, and the adjustment of the aperture is accurate. Adjustment vibrations in different work environments may be avoid to improve the image quality of the camera.

FIG. 1 is a schematic diagram of an exemplary system 100 for automatically adjusting an aperture of a camera according to some embodiments of the present disclosure. The system 100 may include a server 110, a network 120, a camera 130, and a storage 140.

The server 110 may be configured to process information and/or data relating to adjusting an aperture of the camera 130. For example, the server 110 may determine a step length that the aperture will be adjusted. As another example, the server 110 may automatically adjust the aperture based on the determined step length. In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the camera 130, and/or the storage 140 via the network 120. As another example, the server 110 may connect the camera 130, and/or the storage 140 to access stored information and/or data. In some embodiments, the server 110 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to adjusting the aperture of the camera 130 to perform one or more functions described in the present disclosure. For example, the processing engine 112 may determine a step length that the aperture will be adjusted based on the at least two parameters out of three parameters (e.g., a luminance parameter, an exposure parameter, and a focal length parameter) of the camera 130. The processing engine 112 may further determine the luminance parameter, the exposure parameter, and the focal length parameter. As another example, the processing engine 112 may automatically adjust the aperture of the camera 130 based on the determined step length. In some embodiments, the processing engine 112 may include one or more processing engines (e.g., single-core processing engine(s) or multi-core processor(s)). Merely by way of example, the processing engine 112 may be one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components of the system 100 (e.g., the server 110, the camera 130, and the storage 140) may transmit information and/or data to other component(s) in the system 100 via the network 120. For example, the server 110 may obtain parameters including a luminance parameter, an exposure parameter, and/or a focal length parameter from the camera 130 via the network 120. As another example, the server 110 may direct the camera 130 to automatically adjust the aperture thereof via the network 120. In some embodiments, the network 120 may be any type of wired or wireless network, or combination thereof. Merely by way of example, the network 120 may be a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the system 100 may be connected to the network 120 to exchange data and/or information between them.

The camera 130 may be any electronic device that is capable of capturing images or videos. For example, the camera 130 may include an image sensor, a video recorder, or the like, or any combination thereof. In some embodiments, the camera 130 may include any suitable type of camera, such as a fixed camera, a fixed dome camera, a covert camera, a Pan-Tilt-Zoom (PTZ) camera, a thermal camera, or the like, or any combination thereof. In some embodiments, the camera 130 may further include at least one network port. The at least one network port may be configured to send information to and/or receive information from one or more components in the system 100 (e.g., the server 110, the storage 140) via the network 120. In some embodiments, the camera 130 may be implemented on a computing device 200 having one or more components illustrated in FIG. 2, or a mobile device 300 having one or more components illustrated in FIG. 3 in the present disclosure.

The storage 140 may store data and/or instructions. For example, the storage 140 may store data obtained from the camera 130 (e.g., parameters of the camera 130). As another example, the storage 140 may store historical aperture adjustment data (e.g., historical step lengths and corresponding historical parameters of the camera 130). As still another example, the storage 140 may store data and/or instructions that the server 110 may execute or use to perform exemplary methods described in the present disclosure. In some embodiments, the storage 140 may be a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 140 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof.

In some embodiments, the storage 140 may include at least one network port to communicate with other devices in the system 100. For example, the storage 140 may be connected to the network 120 to communicate with one or more components of the system 100 (e.g., the server 110, the camera 130) via the at least one network port. One or more components in the system 100 may access the data or instructions stored in the storage 140 via the network 120. In some embodiments, the storage 140 may be directly connected to or communicate with one or more components in the system 100 (e.g., the server 110, the camera 130). In some embodiments, the storage 140 may be part of the server 110.

Figure 2:
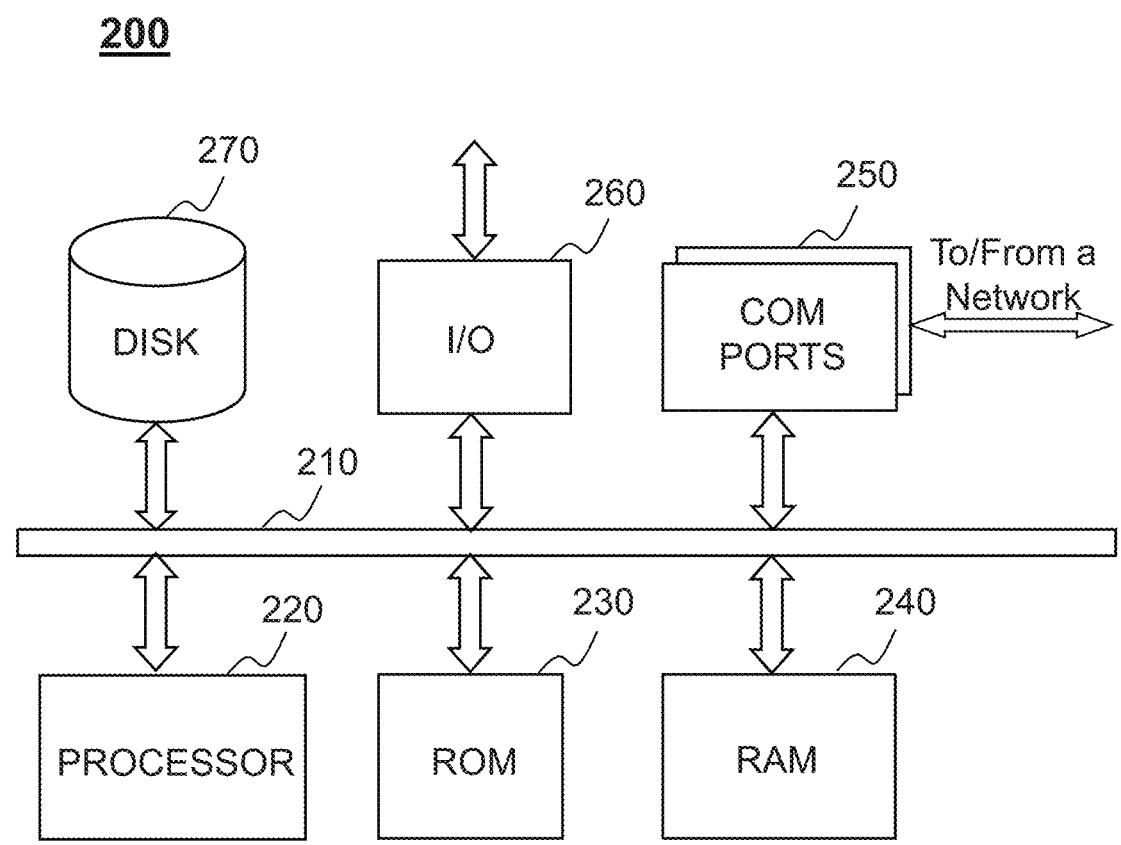
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, and/or the camera 130 may be implemented according to some embodiments of the present disclosure. For example, the processing engine 112 may be implemented on the computing device 200 and configured to perform functions of the processing engine 112 disclosed in this disclosure.

The computing device 200 may be used to implement a system 100 for the present disclosure. The computing device 200 may be used to implement any component of system 100 that perform one or more functions disclosed in the present disclosure. For example, the processing engine 112 may be implemented on the computing device 200, via its hardware, software program, firmware, or a combination thereof. Although only one such computer is shown, for convenience, the computer functions relating to the online to offline service as described herein may be implemented in a distributed fashion on a number of similar platforms, to distribute the processing load.

The computing device 200, for example, may include COM ports 250 connected to and from a network connected thereto to facilitate data communications. The COM port 250 may be any network port or data exchange port to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. The processing circuits may also generate electronic signals including the conclusion or the result and a triggering code. In some embodiments, the trigger code may be in a format recognizable by an operation system (or an application installed therein) of an electronic device (e.g., the camera 130) in the system 100. For example, the trigger code may be an instruction, a code, a mark, a symbol, or the like, or any combination thereof, that can activate certain functions and/or operations of a mobile phone or let the mobile phone execute a predetermined program(s). In some embodiments, the trigger code may be configured to rend the operation system (or the application) of the electronic device to generate a presentation of the conclusion or the result (e.g., a prediction result) on an interface of the electronic device. Then the interface circuits may send out the electronic signals from the processing circuits via the bus 210.

The exemplary computing device may include the internal communication bus 210, program storage and data storage of different forms including, for example, a disk 270, and a read-only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The exemplary computing device may also include operation systems stored in the ROM 230, RAM 240, and/or other type of non-transitory storage medium to be executed by the processor 220. The program instructions may be compatible with the operation systems for providing the online to offline service. The computing device 200 also includes an I/O component 260, supporting input/output between the computer and other components. The computing device 200 may also receive programming and data via network communications.

Merely for illustration, only one processor is illustrated in FIG. 2. Multiple processors are also contemplated; thus, operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
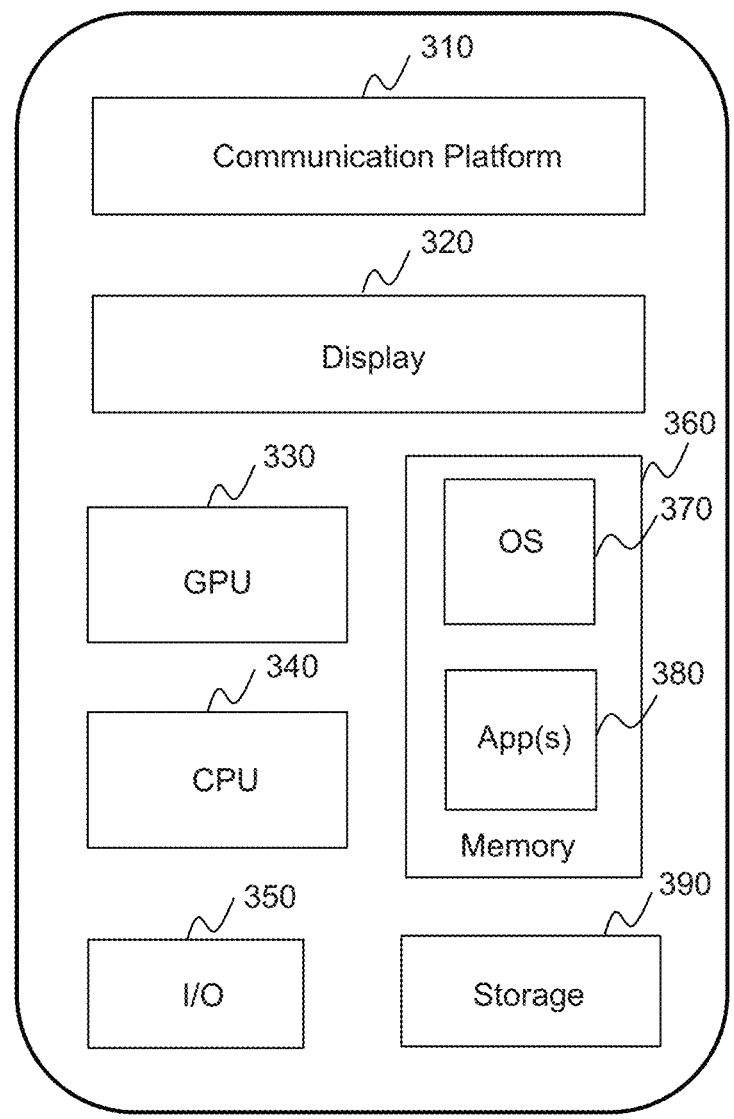
FIG. 3 is a schematic diagram illustrating exemplary hardware and/or software components of a mobile device according to some embodiments of the present disclosure.

FIG. 3 is a schematic diagram illustrating exemplary hardware and/or software components of an exemplary mobile device 300 on which the server 110 or the camera 130 may be implemented according to some embodiments of the present disclosure.

As illustrated in FIG. 3, the mobile device 300 may include a communication platform 310, a display 320, a graphic processing unit (GPU) 330, a central processing unit (CPU) 340, an I/O 350, a memory 360, and a storage 390. The CPU may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to the route planning service. User interactions with the information stream may be achieved via the I/O devices 350 and provided to the processing engine 112 and/or other components of the system 100 via the network 120.

To implement various modules, units, and their functionalities described in the present disclosure, computer hardware platforms may be used as the hardware platform(s) for one or more of the elements described herein (e.g., the system 100, and/or other components of the system 100 described with respect to FIGS. 1-10). The hardware elements, operating systems and programming languages of such computers are conventional in nature, and it is presumed that those skilled in the art are adequately familiar therewith to adapt those technologies to automatically adjust the aperture of the camera 130 as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 4:
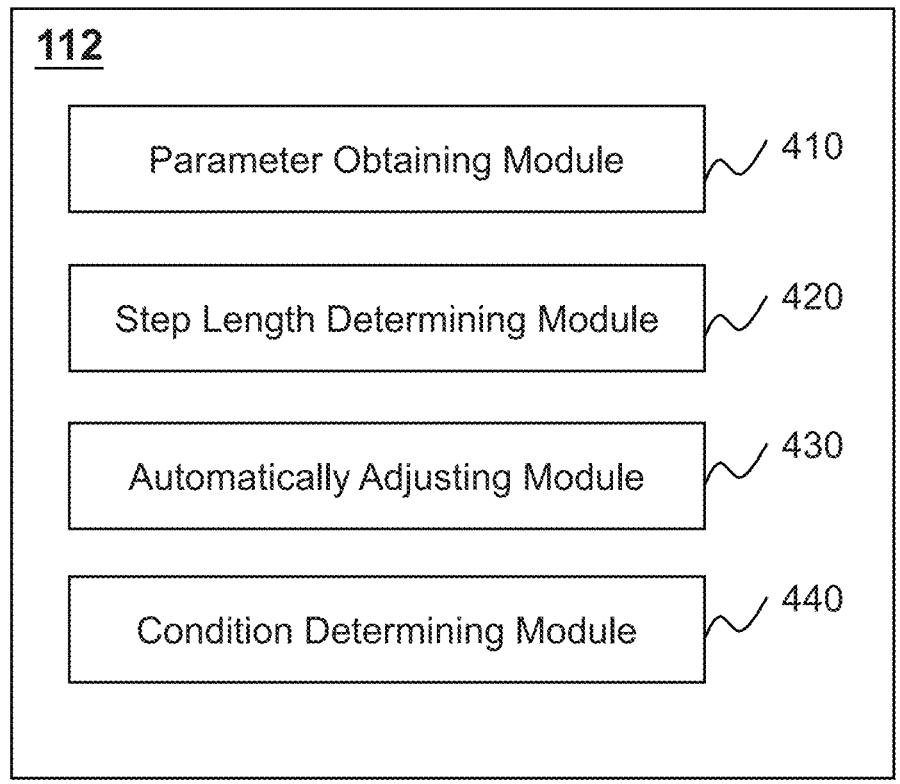
FIG. 4 is a block diagram illustrating an exemplary processing engine according to some embodiments of the present disclosure.

FIG. 4 is a block diagram illustrating an exemplary processing engine 112 according to some embodiments of the present disclosure. As illustrated in FIG. 4, the processing engine 112 may include a parameter obtaining module 410, a step length determining module 420, an automatically adjusting module 430, and a condition determining module 440.

The parameter obtaining module 410 may be configured to obtain at least two parameters out of three parameters of the camera. In some embodiments, the three parameters may include a luminance parameter, an exposure parameter, a focal length parameter, or the like, or any combination thereof.

The step length determining module 420 may be configured to determine a step length of the aperture. For example, the step length determining module 420 may determine the step length based on the at least two parameters according to a mathematical algorithm. As another example, the step length determining module 420 may obtain a three-dimensional table and determine the step length based on the three-dimensional table. The three-dimensional table may include the luminance parameter, the exposure parameter, and the focal length parameter as three coordinate axes of the three-dimensional table.

The automatically adjusting module 430 may be configured to automatically adjust the aperture of the camera based on the step length without human inputs or human interventions.

The condition determining module 440 may be configured to determine whether it is needed to adjust the aperture according to a judgement condition. For example, the condition determining module 440 may determine whether an absolute difference between a current luminance and a target luminance of the camera is greater than a luminance threshold. In response to a determination that the absolute difference is greater than the luminance threshold, the condition determining module 440 may determine the length of the aperture. Otherwise, the condition determining module 440 may stop determining the step length of the aperture, and end the adjusting process.

The modules in the processing engine 112 may be connected to or communicate with each other via a wired connection or a wireless connection. The wired connection may be a metal cable, an optical cable, a hybrid cable, or the like, or any combination thereof. The wireless connection may be a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the parameter obtaining module 410 may be divided into two or more units for obtaining the luminance parameter, the exposure parameter, or the focal length parameter, respectively. As another example, the step length determining module 420 and the condition determining module 440 may be integrated as one module to both determine whether to determine the step length and determine the step length if needed. As still another example, the processing engine 112 may include a storage module (not shown) used to store data and/or information relating to automatically adjusting the aperture of the camera.

Figure 5:
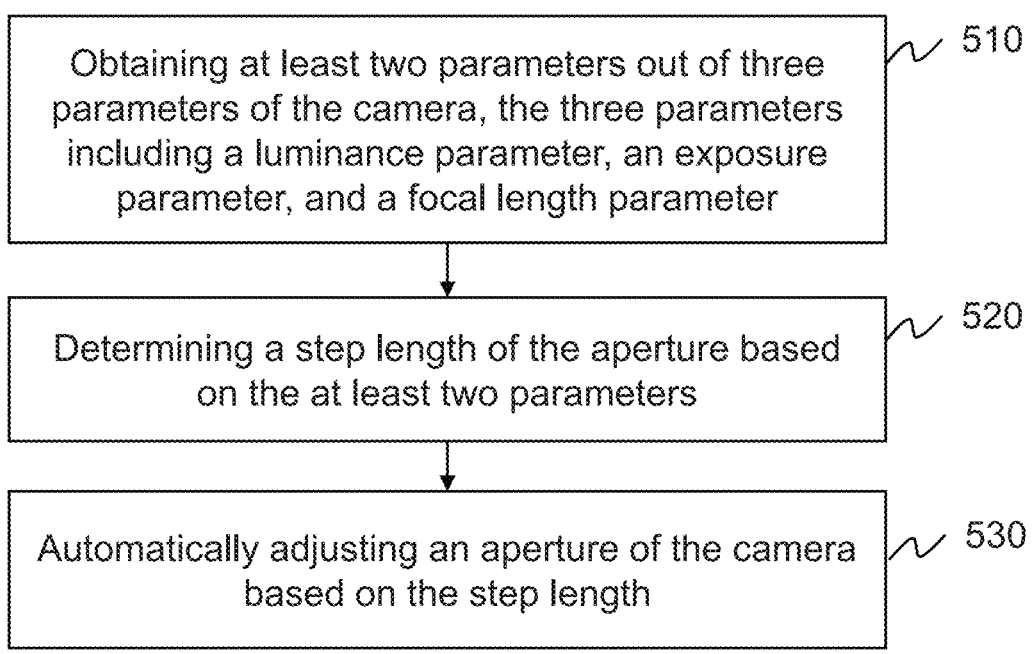
FIG. 5 is a flowchart illustrating an exemplary process for automatically adjusting an aperture of a camera according to some embodiments of the present disclosure.

FIG. 5 is a flowchart illustrating an exemplary process 500 for automatically adjusting an aperture of a camera according to some embodiments of the present disclosure. The process 500 may be executed by the system 100. For example, the process 500 may be implemented as a set of instructions (e.g., an application) stored in the storage ROM 230 or the RAM 240. The processor 220 may execute the set of instructions, and when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 510, the processing engine 112 (e.g., the processor 220, the parameter obtaining module 410) may obtain at least two parameters out of three parameters of the camera.

In some embodiments, the three parameters of the camera may reflect a current work condition and/or an inherent characteristic of the camera. For example, the three parameters may include a luminance parameter, an exposure parameter, a focal length parameter, or the like, or any combination thereof. In some embodiments, the three parameters may be the luminance parameter, the exposure parameter, and the focal length parameter. In some embodiments, the processing engine 112 may obtain all three parameters. In certain embodiments, the processing engine 112 may obtain all three parameters so that a step length can be determined according to Equation (1) in certain cases. In some embodiments, the processing engine 112 may obtain only two (but not the third) of the three parameters. For example, the processing 112 may obtain only the luminance parameter and the exposure parameter so that a step length can be determined according to Equation (2) in certain embodiments. As other example, the processing 112 may obtain only the luminance parameter and the focal length parameter so that a step length can be determined according to Equation (3) in certain embodiments. As other example, the processing 112 may obtain only the exposure parameter and the focal length parameter so that a step length can be determined according to Equation (4) in certain embodiments.

In some embodiments, the luminance parameter may be a numerical value associated with a luminance condition of the camera. The luminance condition may include a current luminance of the camera in a current scene and a target luminance associated with a current gain of the camera. In some embodiments, the current luminance of the camera may be a luminance value of an image that the camera is capturing under the current scene. For example, the current luminance may be a statistical average value of luminances of pixels on the image. In some embodiments, the target luminance may be an inherent characteristic associated with the current gain of the camera in the current scene. For example, the camera may include a two-dimensional table representing different target luminances corresponding to different gains of the camera. The two-dimensional table may be predetermined by a manufacturer of the camera or ruled by the camera industry. The processing engine 112 may look up the two-dimensional table using the known current gain to obtain the target luminance. Exemplary methods or processes for determining the luminance parameter may be found elsewhere in the present disclosure (e.g., FIG. 6 and the descriptions thereof).

In some embodiments, the exposure parameter may be a numerical value associated with an exposure function of the camera. For example, the exposure parameter may be associated with a current shutter speed, a current gain, a maximum shutter speed, a maximum gain of the camera, or the like, or any combination thereof. In some embodiments, the current shutter speed and the current gain may represent a current work condition of the camera. For example, the processing engine 112 may read the current shutter speed and the current gain from the camera via the network 120. In some embodiments, the maximum shutter speed and the maximum gain may be inherent characteristics of the camera. For example, the maximum shutter speed may be predetermined based on a frame rate of the camera. The product of the maximum shutter speed and the frame rate may be 1 second. As another example, the maximum gain may reflect an ability to improve an image luminance of the camera. The maximum gain may be predetermined and stored in a storage device (e.g., the storage 140, the ROM 230 or the RAM 240, etc.). Exemplary methods or processes for determining the exposure parameter may be found elsewhere in the present disclosure (e.g., FIG. 7 and the descriptions thereof).

In some embodiments, the focal length parameter may be a numerical value associated with focal ranges of the camera. The focal range may be a variable range of focal lengths. For example, the focal length parameter may be associated with a current focal range, a focal range at a telephoto end of the camera, a focal range at a medium end of the camera, a focal range at a wide angle end of the camera, or the like, or any combination thereof. In some embodiments, the current focal range may be a current variable range of focal lengths of the camera. In some embodiments, the current focal range may reflect a current zoom time of the camera. In some embodiments, the focal range at the telephoto end may be a variable range of focal lengths at the telephoto end of the camera. In some embodiments, the focal range at the telephoto end may reflect a maximum zoom time of the camera. In some embodiments, the focal range at the medium end may be a variable range of focal lengths at the medium end of the camera. The focal range at the wide angle end may be a variable range of focal lengths at the wide angle end of the camera. In some embodiments, the current focal range, the focal range at the telephoto end, the focal range at the medium end, and the focal range at the wide angle end may be inherent characteristics of the camera and stored in a storage device (e.g., the storage 140, the ROM 230 or the RAM 240, etc.). Exemplary methods or processes for determining the focal length parameter may be found elsewhere in the present disclosure (e.g., FIG. 8 and the descriptions thereof).

In 520, the processing engine 112 (e.g., the processor 220, the step length determining module 420) may determine a step length of the aperture based on the at least two parameters.

In some embodiments, the step length may be a total adjustment value that the processing engine 112 may implement on the aperture to control the amount of light that the camera obtains. For example, the processing engine 112 may increase or decrease the determined step length on the current aperture to enlarge or reduce the current aperture. In some embodiments, different step lengths adjusted on the same aperture may result in different amounts of lights that the camera obtains.

In some embodiments, the processing engine 112 may determine the step length based on the luminance parameter, the exposure parameter, and the focal length parameter. In certain embodiments, the processing engine 112 may determine the step length based on the three parameters according to a first mathematical algorithm. The first mathematical algorithm may be predetermined and stored in a storage device (e.g., the storage 140, the ROM 230 or the RAM 240, etc.). For example, the first mathematical algorithm may be summarized using a large amount of historical experimental data. As another example, the first mathematical algorithm may be calculated according to machine learning methods. The first mathematical algorithm may be a model trained by a large amount of historical experimental data. For example, the processing engine 112 may determine the step length according to Equation (1):

$$D = k \times \frac{\alpha \times \gamma}{\beta}, \quad (1)$$

wherein D denotes the step length, k denotes a coefficient, $\alpha$ denotes the luminance parameter, $\beta$ denotes the exposure parameter, and $\gamma$ denotes the focal length parameter. In some embodiments, the coefficient k may be a minimum adjustable unit. For example, if the aperture is adjusted by 10 steps, the amount of light is almost the same as that without adjusting the aperture. The amount of light is just changed when the aperture is adjusted by 20 steps. The processing engine 112 may determine the coefficient k as 20 steps. In some embodiments, the processing engine 112 may determine the coefficient k according to a control precision of hardware of the aperture and a response degree of the aperture. For example, when the control precision of the hardware is high, the processing engine 112 may determine the coefficient k as a lower value than a circumstance when the control precision of the hardware is low. In some embodiments, the coefficient k may be a normalized value. For example, the coefficient k may be 0-10000. As another example, the coefficient k may be 50, 100, 500, 1000, etc.

In some embodiments, the processing engine 112 may determine the step length based on the luminance parameter and the exposure parameter according to a second mathematical algorithm. The second mathematical algorithm may be predetermined and stored in a storage device (e.g., the storage 140, the ROM 230 or the RAM 240, etc.). For example, the second mathematical algorithm may be summarized using a large amount of historical experimental data. As another example, the second mathematical algorithm may be calculated according to machine learning methods. The second mathematical algorithm may be a model trained by a large amount of historical experimental data. For example, the processing engine 112 may determine the step length according to Equation (2):

$$D = k \times \frac{\alpha}{\beta}, \qquad (2)$$

wherein D denotes the step length, k denotes a coefficient, α denotes the luminance parameter, and β denotes the exposure parameter. In some embodiments, the coefficient k may be a minimum adjustable unit. For example, if the aperture is adjusted by 10 steps, the amount of light is almost the same as that without adjusting the aperture. The amount of light is just changed when the aperture is adjusted by 20 steps. The processing engine 112 may determine the coefficient k as 20 steps. In some embodiments, the processing engine 112 may determine the coefficient k according to a control precision of hardware of the aperture and a response degree of the aperture. For example, when the control precision of the hardware is high, the processing engine 112 may determine the coefficient k as a lower value than a circumstance when the control precision of the hardware is low. In some embodiments, the coefficient k may be a normalized value. For example, the coefficient k may be 0-10000. As another example, the coefficient k may be 50, 100, 500, 1000, etc. In some embodiments, the coefficients k in Equation (1) and Equation (2) may be the same or different.

In some embodiments, the processing engine 112 may determine the step length based on the luminance parameter and the focal length parameter according to a third mathematical algorithm. The third mathematical algorithm may be predetermined and stored in a storage device (e.g., the storage 140, the ROM 230 or the RAM 240, etc.). For example, the third mathematical algorithm may be summarized using a large amount of historical experimental data. As another example, the third mathematical algorithm may be calculated according to machine learning methods. The third mathematical algorithm may be a model trained by a large amount of historical experimental data. For example, the processing engine 112 may determine the step length according to Equation (3):

$$D = k \times \alpha \times \gamma, \qquad (3)$$

wherein D denotes the step length, k denotes a coefficient, α denotes the luminance parameter, and γ denotes the focal length parameter. In some embodiments, the coefficient k may be a minimum adjustable unit. For example, if the aperture is adjusted by 10 steps, the amount of light is almost the same as that without adjusting the aperture. The amount of light is just changed when the aperture is adjusted by 20 steps. The processing engine 112 may determine the coefficient k as 20 steps. In some embodiments, the processing engine 112 may determine the coefficient k according to a control precision of hardware of the aperture and a response degree of the aperture. For example, when the control precision of the hardware is high, the processing engine 112 may determine the coefficient k as a lower value than a circumstance when the control precision of the hardware is low. In some embodiments, the coefficient k may be a normalized value. For example, the coefficient k may be 0-10000. As another example, the coefficient k may be 50, 100, 500, 1000, etc. In some embodiments, the coefficients k in Equation (1), Equation (2), and/or Equation (3) may be the same or different.

In some embodiments, the processing engine 112 may determine the step length based on the exposure parameter and the focal length parameter according to a fourth mathematical algorithm. The fourth mathematical algorithm may be predetermined and stored in a storage device (e.g., the storage 140, the ROM 230 or the RAM 240, etc.). For example, the fourth mathematical algorithm may be summarized using a large amount of historical experimental data. As another example, the fourth mathematical algorithm may be calculated according to machine learning methods. The fourth mathematical algorithm may be a model trained by a large amount of historical experimental data. For example, the processing engine 112 may determine the step length according to Equation (4):

$$D = k \times \frac{\gamma}{\beta}, \qquad (4)$$

wherein D denotes the step length, k denotes a coefficient, β denotes the exposure parameter, and γ denotes the focal length parameter. In some embodiments, the coefficient k may be a minimum adjustable unit. For example, if the aperture is adjusted by 10 steps, the amount of light is almost the same as that without adjusting the aperture. The amount of light is just changed when the aperture is adjusted by 20 steps. The processing engine 112 may determine the coefficient k as 20 steps. In some embodiments, the processing engine 112 may determine the coefficient k according to a control precision of hardware of the aperture and a response degree of the aperture. For example, when the control precision of the hardware is high, the processing engine 112 may determine the coefficient k as a lower value than a circumstance when the control precision of the hardware is low. In some embodiments, the coefficient k may be a normalized value. For example, the coefficient k may be 0-10000. As another example, the coefficient k may be 50, 100, 500, 1000, etc. In some embodiments, the coefficients k in Equation (1), Equation (2), Equation (3), and/or Equation (4) may be the same or different.

In some embodiments, the processing engine 112 may determine the step length based on the at least two parameters according to a table. For example, the table may be a two-dimensional table including any combination of two parameters out of the luminance parameter, the exposure parameter, and the focal length parameter as two coordinate axes of the two-dimensional table, respectively. Recommended step lengths corresponding to different combinations of the two parameters may be the content in the two-dimensional space. The processing engine 112 may look up the two-dimensional table using any combination of the two parameters to obtain the corresponding step length. As another example, the table may be a three-dimensional table including the three parameters as three coordinate axes of the three-dimensional table, respectively. Recommended step lengths corresponding to the three parameters may be the contents in the three-dimensional space. The processing engine 112 may look up the three-dimensional table using the three parameters to obtain the corresponding step length. In some embodiments, the processing engine 112 may pre-establish the table and stored the table in a storage device (e.g., the storage 140, the ROM 230 or the RAM 240, etc.). The processing engine 112 may access the storage device to look up the table. Exemplary methods or processes for determining the step length according to the table may be found elsewhere in the present disclosure (e.g., FIG. 9 and the descriptions thereof).

In some embodiments, the processing engine 112 may select a method to determine the step length according to different situations. For example, if the camera is newly used, the processing engine 112 may determine the step length according to any one of the Equations (1)-(4) rather than a table. As another example, if the aperture of the camera needs to be adjusted quickly, the processing engine 112 may determine the step length according to a table instead of any one of the Equations (1)-(4). As still another example, the processing engine 112 may randomly select any one of the Equations (1)-(4) or a table to determine the step length.

In 530, the processing engine 112 (e.g., the processor 220, the automatically adjusting module 430) may automatically adjust the aperture of the camera based on the step length.

In some embodiments, the term "automatically" may mean that the aperture of the camera may be adjusted by the processing engine 112 without human inputs or human interventions. The processing engine 112 may automatically adjust the aperture after determining the step length.

In some embodiments, the processing engine 112 may first determine whether it is needed to adjust the aperture according to a judgement condition. The judgement condition may be based on whether the amount of light is enough or achieves a target amount. If so, the processing engine 112 may determine that the aperture is not needed to be adjusted, and stop determining the step length. If not, the processing engine 112 may continue determining the step length. Exemplary methods or processes for determining whether to adjust the aperture of the camera may be found elsewhere in the present disclosure (e.g., FIG. 10 and the descriptions thereof).

It should be noted that the above description is merely provided for the purposes of illustration, and not intended to limit the scope of the present disclosure. For persons having ordinary skills in the art, multiple variations and modifications may be made under the teachings of the present disclosure. For example, operation 510 may be divided into two or three steps for obtaining two or three parameters, respectively. As another example, the three parameters of operation 510 may be other parameters associated with other characteristics of the camera. As still another example, other alternatives do exist and other factors may be taken into consideration in the determination of the target path. However, those variations and modifications do not depart from the scope of the present disclosure.

Figure 6:
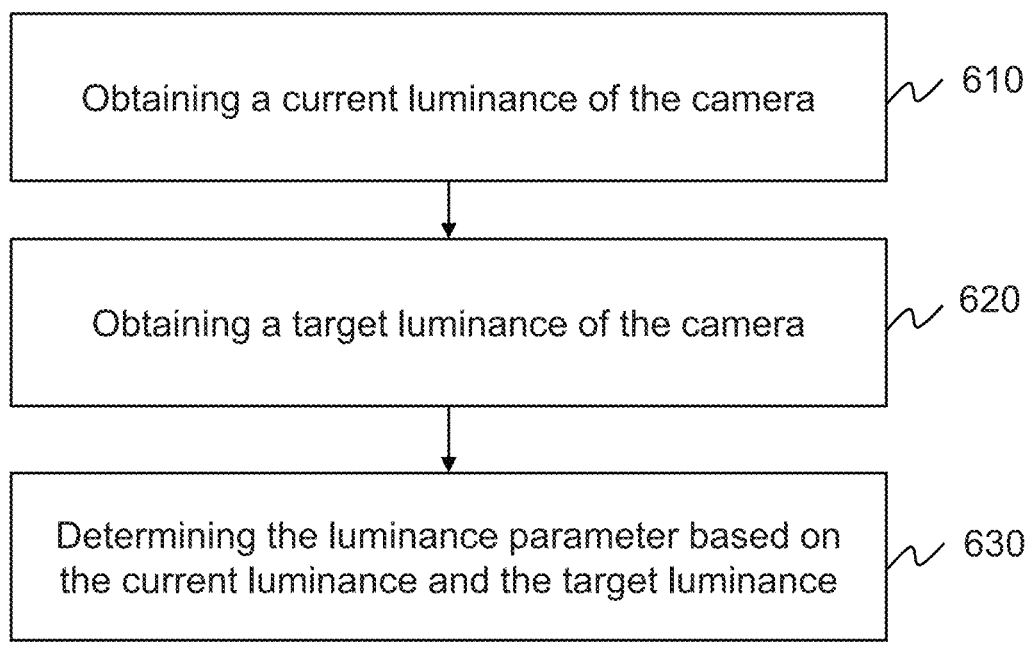
FIG. 6 is a flowchart illustrating an exemplary process for determining a luminance parameter according to some embodiments of the present disclosure.

FIG. 6 is a flowchart illustrating an exemplary process 600 for determining a luminance parameter according to some embodiments of the present disclosure. The process 600 may be executed by the system 100. For example, the process 600 may be implemented as a set of instructions (e.g., an application) stored in the storage ROM 230 and/or RAM 240. The processor 220 may execute the set of instructions, and when executing the instructions, it may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

In 610, the processing engine 112 (e.g., the processor 220, the parameter obtaining module 410) may obtain a current luminance of the camera.

In some embodiments, the current luminance of the camera may be a luminance value of an image that the camera is capturing under the current scene. For example, the current luminance may be a statistical average value of luminances of pixels on the image. In some embodiments, the camera may display the current luminance in real time, and send the current luminance to the processing engine 112 via the network 120. In some embodiments, the processing engine 112 may calculate the current luminance in real time based on luminances of pixels on the image obtained from the camera via the network 120.

In 620, the processing engine 112 (e.g., the processor 220, the parameter obtaining module 410) may obtain a target luminance of the camera.

In some embodiments, the target luminance may be an inherent characteristic associated with the current gain of the camera in the current scene. For example, the camera may include a two-dimensional table representing different target luminances corresponding to different gains of the camera. The two-dimensional table may be predetermined by a manufacturer of the camera or ruled by the camera industry. The processing engine 112 may look up the two-dimensional table using the known current gain to obtain the target luminance. In some embodiments, the two-dimensional table may be stored in a storage device (e.g., the storage 140, the ROM 230 or the RAM 240, etc.) or the camera. The processing engine 112 may obtain the target luminance from the storage device or the camera via the network 120.

In 630, the processing engine 112 (e.g., the processor 220, the parameter obtaining module 410) may determine the luminance parameter based on the current luminance and the target luminance.

In some embodiments, the luminance parameter may be a numerical value determined based on the current luminance and the target luminance of the camera. For example, the processing engine 112 may determine the luminance parameter based on the current luminance and the target luminance according to a fifth mathematical algorithm. The fifth mathematical algorithm may be predetermined and stored in a storage device (e.g., the storage 140, the ROM 230 or the RAM 240, etc.). For example, the fifth mathematical algorithm may be summarized using a large amount of historical experimental data (e.g., historical current luminances, historical target luminances, historical step lengths, etc.). As another example, the fifth mathematical algorithm may be calculated according to machine learning methods. The fifth mathematical algorithm may be a model trained by a large amount of historical experimental data. In some embodiments, the processing engine 112 may obtain the current luminance and the target luminance from the camera, and access the storage device to obtain the fifth mathematical algorithm to determine the luminance parameter.

In some embodiments, the processing engine 112 may determine the luminance parameter based on the current luminance and the target luminance of the camera according to Equation (5):

$$\alpha = \frac{A}{A_1}, \quad (5)$$

wherein α denotes the luminance parameter of the camera, A denotes a luminance difference between the current luminance and the target luminance $A_1$, and $A_1$ denotes the target luminance.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 600.

Figure 7:
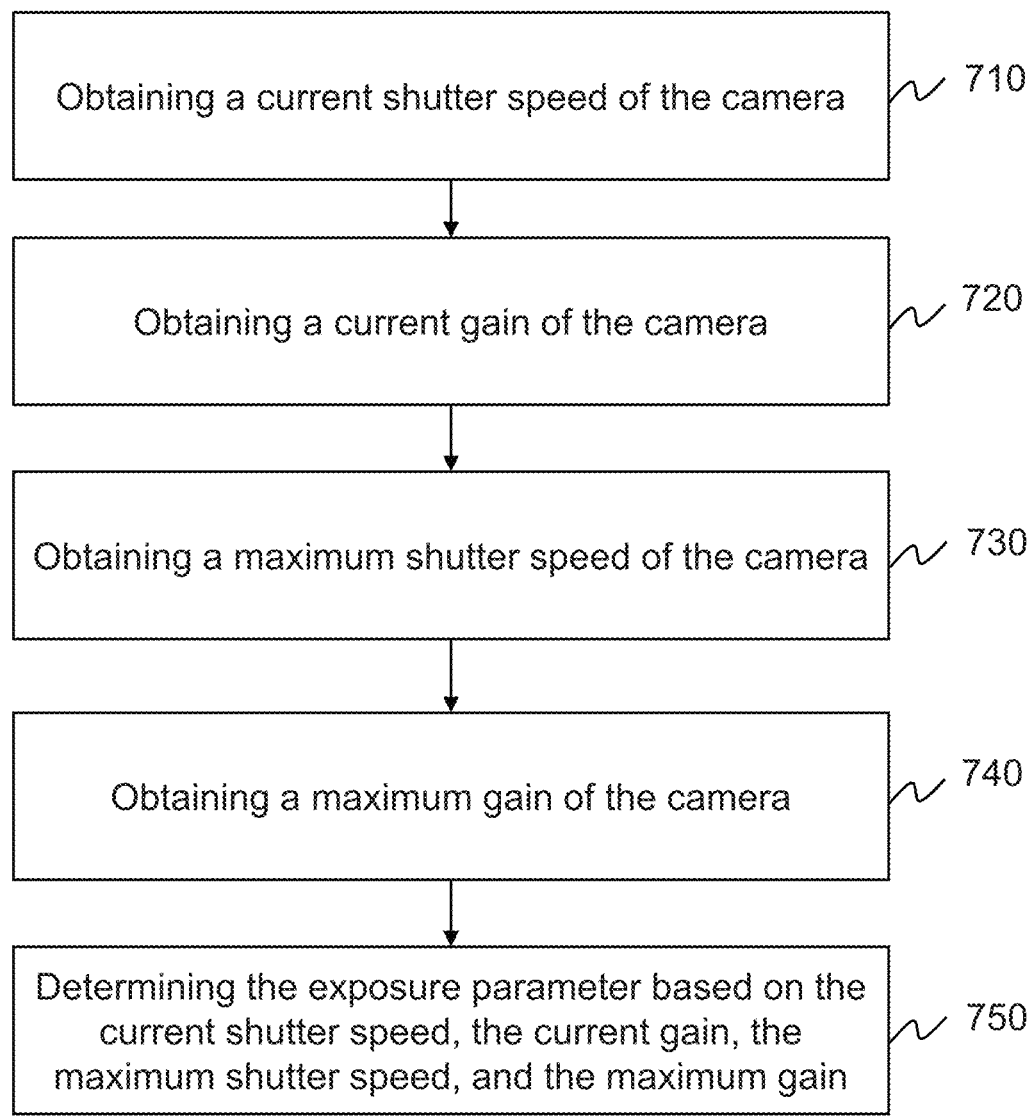
FIG. 7 is a flowchart illustrating an exemplary process for determining an exposure parameter according to some embodiments of the present disclosure.

FIG. 7 is a flowchart illustrating an exemplary process 700 for determining an exposure parameter according to some embodiments of the present disclosure. The process 700 may be executed by the system 100. For example, the process 700 may be implemented as a set of instructions (e.g., an application) stored in the storage ROM 230 or the RAM 240. The processor 220 may execute the set of instructions, and when executing the instructions, it may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In 710, the processing engine 112 (e.g., the processor 220, the parameter obtaining module 410) may obtain a current shutter speed of the camera.

In some embodiments, the current shutter speed may represent a current work condition of the camera. The current shutter speed may reflect a current exposure time of the camera. In some embodiments, the camera may display the current shutter speed on an image or show the current shutter speed on components of the camera. The processing engine 112 may obtain the current shutter speed from the camera via the network 120.

In 720, the processing engine 112 (e.g., the processor 220, the parameter obtaining module 410) may obtain a current gain of the camera.

In some embodiments, the current gain may represent a current work condition of the camera. The current gain may be a magnification of a current image that the camera captures. In some embodiments, the camera may display the current gain on an image. The processing engine 112 may obtain the current gain from the camera via the network 120.

In 730, the processing engine 112 (e.g., the processor 220, the parameter obtaining module 410) may obtain a maximum shutter speed of the camera.

In some embodiments, the maximum shutter speed may be inherent characteristics of the camera. The maximum shutter speed may reflect a minimum exposure time of the camera. In some embodiments, the maximum shutter speed may be predetermined based on a frame rate of the camera. For example, the product of the maximum shutter speed and the frame rate may be 1 second. The maximum shutter speed may be stored in a storage device (e.g., the storage 140, the ROM 230 or the RAM 240, etc.) or the camera. The processing engine 112 may obtain the maximum shutter speed from the storage device or the camera via the network 120.

In 740, the processing engine 112 (e.g., the processor 220, the parameter obtaining module 410) may obtain a maximum gain of the camera.

In some embodiments, the maximum gain may be inherent characteristics of the camera. The maximum gain may reflect an ability to improve an image luminance of the camera. The maximum gain may be predetermined and stored in a storage device (e.g., the storage 140, the ROM 230 or the RAM 240, etc.) or the camera. The processing engine 112 may obtain the maximum gain from the storage device or the camera via the network 120.

In 750, the processing engine 112 (e.g., the processor 220, the parameter obtaining module 410) may determine the exposure parameter based on the current shutter speed, the current gain, the maximum shutter speed, and the maximum gain.

In some embodiments, the exposure parameter may be a numerical value determined based on the current shutter speed, the current gain, the maximum shutter speed, and the maximum gain of the camera. For example, the processing engine 112 may determine the exposure parameter based on the current shutter speed, the current gain, the maximum shutter speed, and the maximum gain according to a sixth mathematical algorithm. The sixth mathematical algorithm may be predetermined and stored in a storage device (e.g., the storage 140, the ROM 230 or the RAM 240, etc.). For example, the sixth mathematical algorithm may be summarized using a large amount of historical experimental data (e.g., historical current shutter speeds, historical current gains, historical maximum shutter speeds, historical maximum gains, historical step lengths, etc.). As another example, the sixth mathematical algorithm may be calculated according to machine learning methods. The sixth mathematical algorithm may be a model trained by a large amount of historical experimental data. In some embodiments, the processing engine 112 may obtain the current shutter speed, the current gain, the maximum shutter speed, and the maximum gain from the camera or the storage device to determine the exposure parameter.

In some embodiments, the processing engine 112 may determine the exposure parameter based on the current shutter speed, the current gain, the maximum shutter speed, and the maximum gain according to Equation (6):

$$\beta = \frac{B}{B_1}, \quad (6)$$

wherein β denotes the exposure parameter, B denotes a product of the current shutter speed and the current gain, $B_1$ denotes a product of the maximum shutter speed and the maximum gain.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 700.

Figure 8:
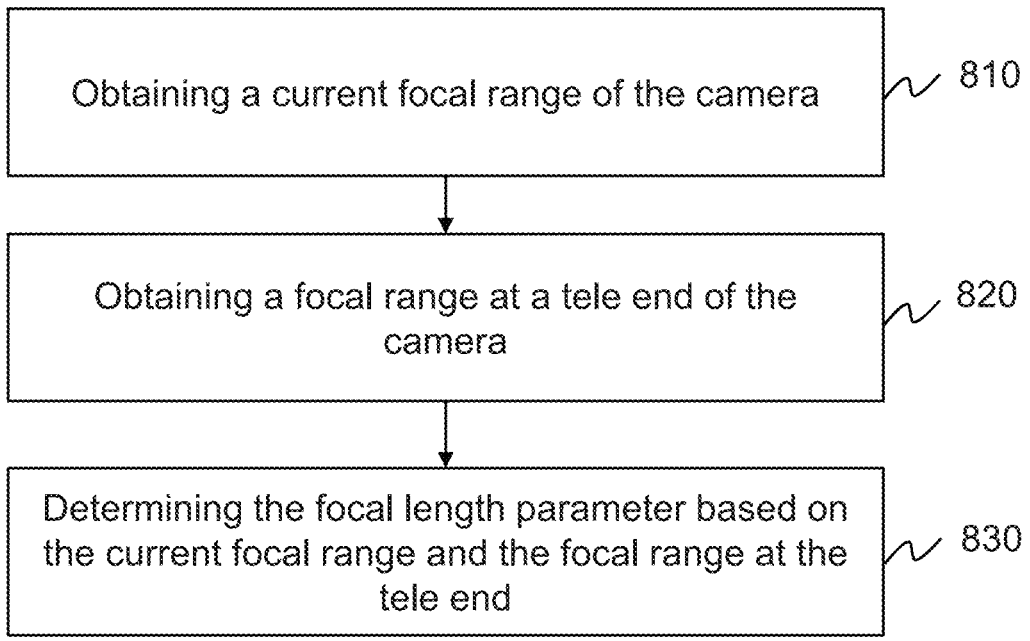
FIG. 8 is a flowchart illustrating an exemplary process for determining a focal length parameter according to some embodiments of the present disclosure.

FIG. 8 is a flowchart illustrating an exemplary process 800 for determining a focal length parameter according to some embodiments of the present disclosure. The process 800 may be executed by the system 100. For example, the process 800 may be implemented as a set of instructions (e.g., an application) stored in the storage ROM 230 or the RAM 240. The processor 220 may execute the set of instructions, and when executing the instructions, it may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process as illustrated in FIG. 8 and described below is not intended to be limiting.

In 810, the processing engine 112 (e.g., the processor 220, the parameter obtaining module 410) may obtain a current focal range of the camera.

In some embodiments, the current focal range may be a current variable range of focal lengths of the camera. The current focal range may reflect a current zoom time of the camera. In some embodiments, the current focal range may be inherent characteristics of the camera and stored in a storage device (e.g., the storage 140, the ROM 230 or the RAM 240, etc.) or the camera. The processing engine 112 may obtain the current focal range from the storage device or the camera via the network 120.

In 820, the processing engine 112 (e.g., the processor 220, the parameter obtaining module 410) may obtain a focal range at a telephoto end of the camera.

In some embodiments, the focal range at the telephoto end may be a variable range of focal lengths at the telephoto end of the camera. The telephoto end may refer to a predetermined range of focal lengths. For example, the focal range at the telephoto end may be a variable range of focal lengths between 135 mm and 300 mm. In some embodiments, the focal range at the telephoto end may reflect a maximum zoom time of the camera. In some embodiments, the focal range at the telephoto end may be inherent characteristics of the camera and stored in a storage device (e.g., the storage 140, the ROM 230 or the RAM 240, etc.) or the camera. The processing engine 112 may obtain the focal range at the telephoto end from the storage device or the camera via the network 120.

In 830, the processing engine 112 (e.g., the processor 220, the parameter obtaining module 410) may determine the focal length parameter based on the current focal range and the focal range at the telephoto end.

In some embodiments, the focal length parameter may be a numerical value determined based on the current focal range, the focal range at the telephoto end, the focal range at the medium end, and/or the focal range at the wide angle end. For example, the processing engine 112 may determine the focal length parameter based on the current focal range and the focal range at the telephoto end according to a seventh mathematical algorithm. The seventh mathematical algorithm may be predetermined and stored in a storage device (e.g., the storage 140, the ROM 230 or the RAM 240, etc.). For example, the seventh mathematical algorithm may be summarized using a large amount of historical experimental data (e.g., historical current focal ranges, historical focal ranges at the telephoto end, historical step lengths, etc.). As another example, the seventh mathematical algorithm may be calculated according to machine learning methods. The seventh mathematical algorithm may be a model trained by a large amount of historical experimental data. In some embodiments, the processing engine 112 may obtain the current focal range and the focal range at the telephoto end from the camera or the storage device to determine the focal length parameter.

In some embodiments, the processing engine 112 may determine the focal length parameter based on the current focal range and the focal range at the telephoto end according to Equation (7):

$$\gamma = \frac{C}{C_1}, \quad (7)$$

wherein $\gamma$ denotes the focal length parameter, C denotes the current focal range, $C_1$ denotes the focal range at the telephoto end.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the exemplary process 800.

FIG. 9 is a flowchart illustrating an exemplary process 900 for determining a step length of an aperture according to some embodiments of the present disclosure. The process 900 may be executed by the system 100. For example, the process 900 may be implemented as a set of instructions (e.g., an application) stored in the storage ROM 230 or the RAM 240. The processor 220 may execute the set of instructions, and when executing the instructions, it may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 9 and described below is not intended to be limiting.

In 910, the processing engine 112 (e.g., the processor 220, the step length determining module 420) may obtain a three-dimensional table including the luminance parameter, the exposure parameter, and the focal length parameter as three coordinate axes of the three-dimensional table.

In some embodiments, the luminance parameter, the exposure parameter, and the focal length parameter may be the X-axis, Y-axis, and Z-axis of the three-dimensional table, respectively. In the three-dimensional table, recommended step lengths corresponding to each of the three parameters may be the contents in the three-dimensional space. Each recommended step length may correspond to a luminance parameter, an exposure parameter, and a focal length parameter.

In some embodiments, the processing engine 112 may pre-establish the three-dimensional table. For example, the processing engine 112 may determine relationships between different apertures and different luminance parameters using first experimental data including different focal length parameters and the same exposure parameter, and/or second experimental data including different exposure parameters and the same focal length parameter. As another example, the processing engine 112 may determine relationships between different apertures and different exposure parameters using third experimental data including different focal length parameters and the same luminance parameter, and/or fourth experimental data including different luminance parameters and the same focal length parameter. As still another example, the processing engine 112 may determine relationships between different apertures and different focal length parameters using fifth experimental data including different exposure parameters and the same luminance parameter, and/or sixth experimental data including different luminance parameters and the same exposure parameter. In some embodiments, the three-dimensional table may be established manually by operators of the system 100 or automatically by the processing engine 112. The three-dimensional table may be stored in a storage device (e.g., the storage 140, the ROM 230 or the RAM 240, etc.) or the camera. The processing engine 112 may look up the three-dimensional table from the storage device and the camera via the network 120.

In 920, the processing engine 112 (e.g., the processor 220, the step length determining module 420) may determine the step length based on the three-dimensional table.

In some embodiments, under a certain circumstance, the processing engine 112 may calculate the luminance parameter, the exposure parameter, and the focal length parameter of the camera, and look up the three-dimensional table using the calculated three parameters respectively to find out the corresponding step length.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the exemplary process 900.

Figure 10:
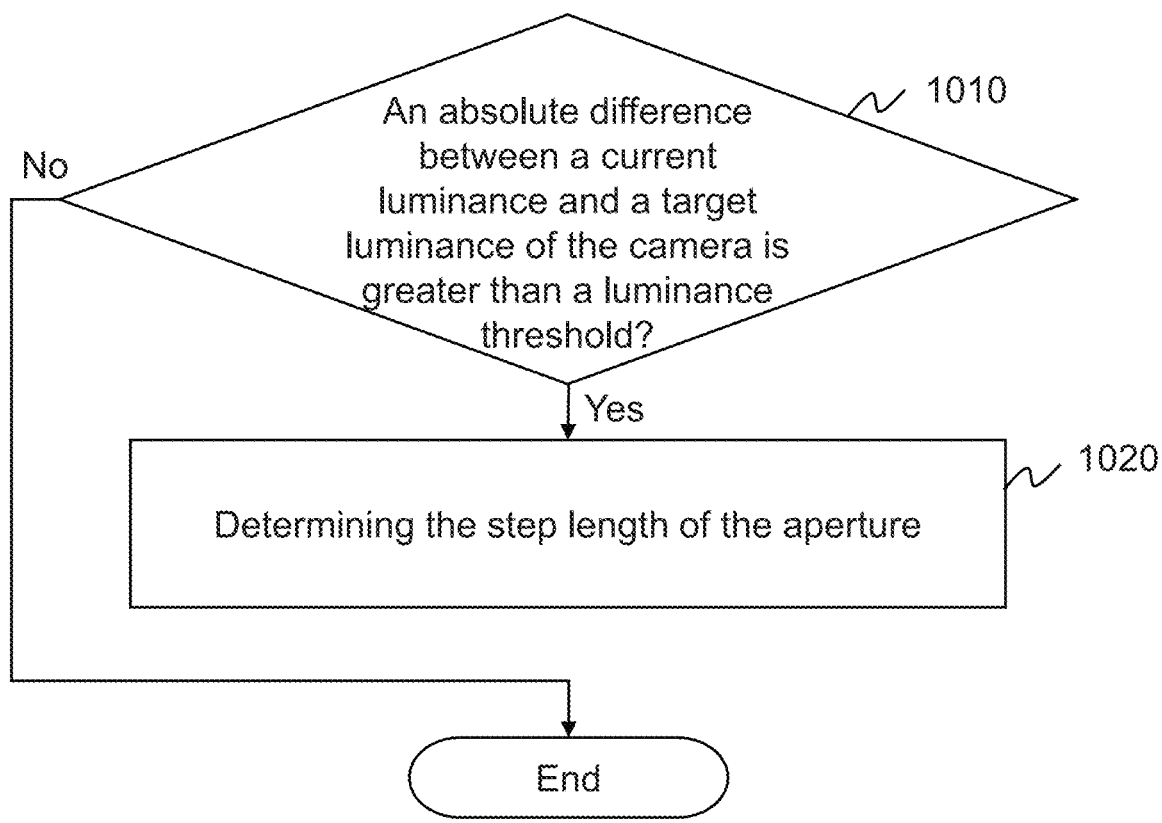
FIG. 10 is a flowchart illustrating an exemplary process for determining whether to adjust an aperture of a camera according to some embodiments of the present disclosure.

FIG. 10 is a flowchart illustrating an exemplary process 1000 for determining whether to adjust an aperture of a camera according to some embodiments of the present disclosure. The process 1000 may be executed by the system 100. For example, the process 1000 may be implemented as a set of instructions (e.g., an application) stored in the storage ROM 230 or the RAM 240. The processor 220 may execute the set of instructions, and when executing the instructions, it may be configured to perform the process 1000. The operations of the illustrated process presented below are intended to be illustrative. In some embodiments, the process 1000 may be accomplished with one or more additional operations not described and/or without one or more of the operations discussed. Additionally, the order in which the operations of the process as illustrated in FIG. 10 and described below is not intended to be limiting.

In 1010, the processing engine 112 (e.g., the processor 220, the condition determining module 440) may determine whether an absolute difference between a current luminance and a target luminance of the camera is greater than a luminance threshold.

In response to a determination that the absolute difference is greater than the luminance threshold, in 1020, the processing engine 112 (e.g., the processor 220, the condition determining module 440) may determine the length of the aperture.

In response to a determination that the absolute difference is not greater than the luminance threshold, in 1020, the processing engine 112 (e.g., the processor 220, the condition determining module 440) may stop determining the step length of the aperture, and end the adjusting process.

In some embodiments, the determination of whether the absolute difference is greater than the luminance threshold may be used to determine whether the current luminance is close to the target luminance. For example, if the absolute difference is greater than the luminance threshold, the processing engine 112 may determine that the current luminance is far away from the target luminance, and the aperture of the camera needs to be adjusted. As another example, if the absolute difference is not greater than the luminance threshold, the processing engine 112 may determine that the current luminance almost achieves the target luminance, and the aperture does not need to be adjusted.

In some embodiments, the luminance threshold may be a preset value stored in a storage (e.g., the storage 140, the ROM 230 or the RAM 240, etc.) of the system 100, or may be adjusted and dynamically determined based on different situations (e.g., different apertures, different cameras, etc.).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 1000.

Figure 11:
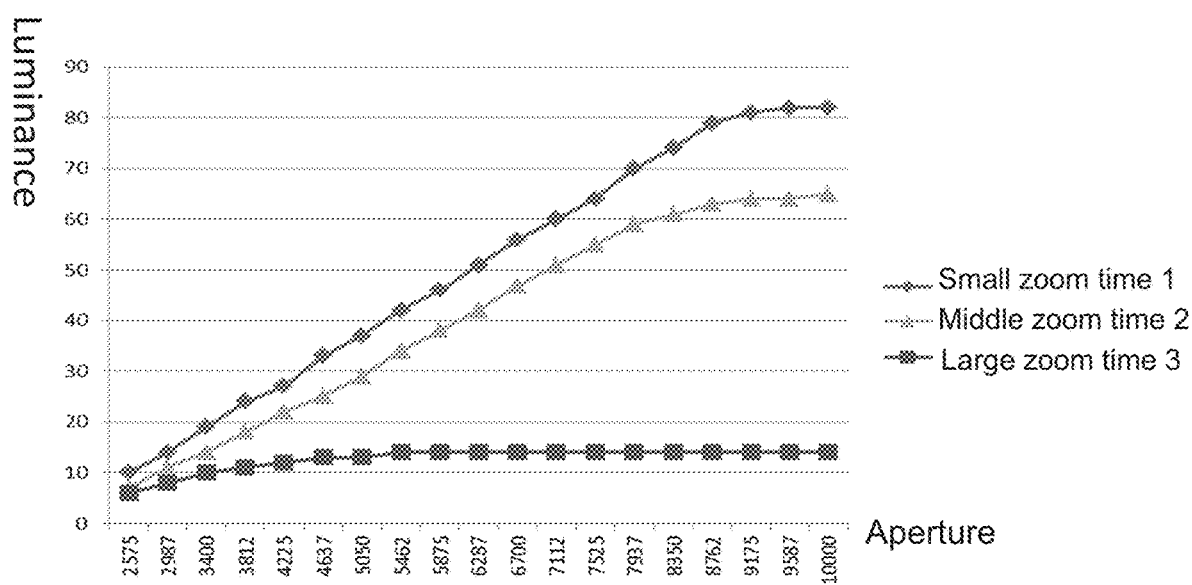
FIG. 11 is a schematic diagram illustrating exemplary relationships between an aperture and a luminance under the same shutter speed, the same gain, and different zoom times according to some embodiments of the present disclosure.

FIG. 11 is a schematic diagram illustrating exemplary relationships between an aperture and a luminance under the same shutter speed, the same gain, and different zoom times according to some embodiments of the present disclosure. As shown in FIG. 11, a difference of the luminance caused by adjusting the aperture per adjustment unit are different under the same shutter speed, the same gain, and different zoom times (or different focal ranges). The difference of the luminance caused by adjusting the aperture per adjustment unit decreases with the increasing of the zoom time (or the increasing of the focal range).

Figure 12:
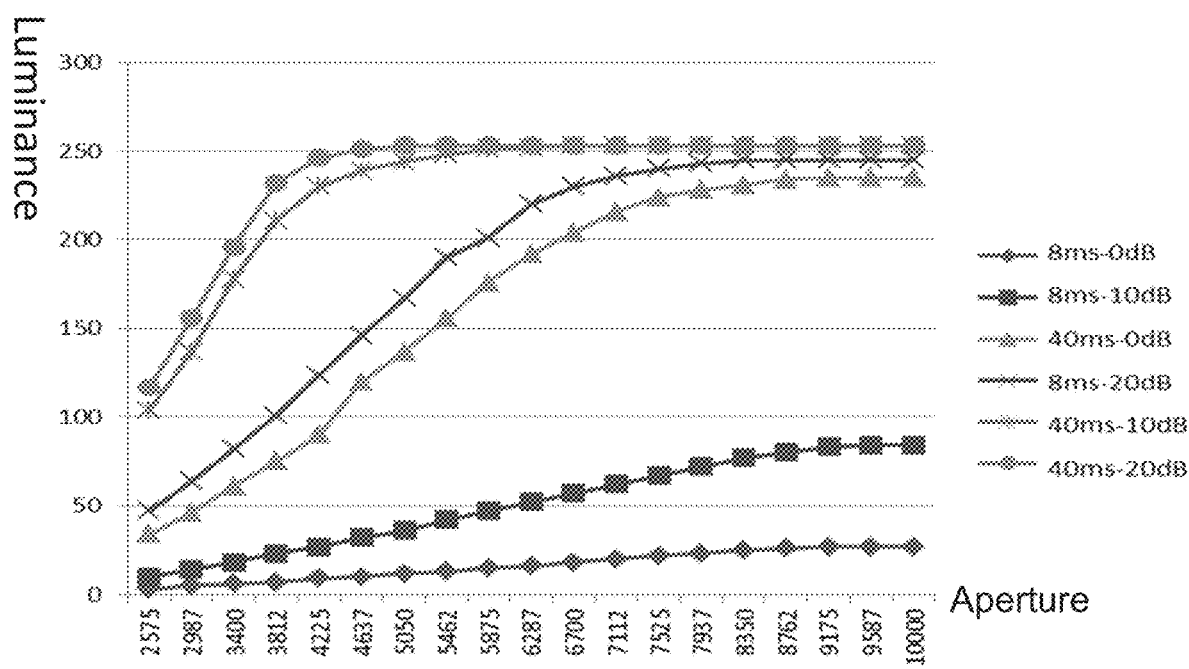
FIG. 12 is a schematic diagram illustrating exemplary relationships between an aperture and a luminance under different shutter speeds, different gains, and the same zoom time according to some embodiments of the present disclosure.

FIG. 12 is a schematic diagram illustrating exemplary relationships between an aperture and a luminance under different shutter speeds, different gains, and the same zoom time according to some embodiments of the present disclosure. As shown in FIG. 12, a difference of the luminance caused by adjusting the aperture per adjustment unit are different under different shutter speeds, different gains, and the same zoom time (or the same focal range). The difference of the luminance caused by adjusting the aperture per adjustment unit increases with the increasing of the shutter speed and the gain. As shown in FIG. 11 and FIG. 12, the luminance differences caused by adjusting the aperture per adjustment unit are different under different shutter speeds, different gains, and/or different focal ranges.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 1703, Perl, COBOL 1702, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for automatically adjusting an aperture of a camera, comprising:
  at least one storage medium including a set of instructions for automatically adjusting the aperture of the camera; and
  at least one processor in communication with the storage medium, wherein when executing the set of instructions, the at least one processor is directed to:
    obtain at least two parameters out of three parameters of the camera, the three parameters including a luminance parameter, an exposure parameter, and a focal length parameter;
    determine a step length of the aperture based on the at least two parameters, wherein to determine the step length of the aperture, the at least one processor is directed to:
      determine whether an absolute difference between a current luminance and a target luminance of the camera is greater than a luminance threshold; and
      in response to a determination that the absolute difference is greater than the luminance threshold, determine the step length of the aperture; and
    automatically adjust the aperture of the camera based on the step length.

2. The system of claim 1, wherein the at least one processor is further directed to:
  obtain a current luminance of the camera;
  obtain a target luminance of the camera; and
  determine the luminance parameter based on the current luminance and the target luminance.

3. The system of claim 1, wherein the at least one processor is further directed to:
  obtain a current shutter speed of the camera;
  obtain a current gain of the camera;
  obtain a maximum shutter speed of the camera;
  obtain a maximum gain of the camera; and
  determine the exposure parameter based on the current shutter speed, the current gain, the maximum shutter speed, and the maximum gain.

4. The system of claim 1, wherein the at least one processor is further directed to:
  obtain a current focal range of the camera;
  obtain a focal range at a telephoto end of the camera; and
  determine the focal length parameter based on the current focal range and the focal range at the telephoto end.

5. The system of claim 1, wherein to determine the step length of the aperture, the at least one processor is further directed to:
  determine the step length based on the luminance parameter, the exposure parameter, and the focal length parameter according to $$D = k \times \frac{\alpha \times \gamma}{\beta},$$

wherein D denotes the step length, k denotes a coefficient, α denotes the luminance parameter, β denotes the exposure parameter, and γ denotes the focal length parameter.

6. The system of claim 1, wherein to determine the step length of the aperture, the at least one processor is further directed to:
  determine the step length based on the luminance parameter and the exposure parameter according to $$D = k \times \frac{\alpha}{\beta},$$

wherein D denotes the step length, k denotes a coefficient, α denotes the luminance parameter, and β denotes the exposure parameter.

7. The system of claim 1, wherein to determine the step length of the aperture, the at least one processor is further directed to:
  determine the step length based on the luminance parameter and the focal length parameter according to D=k× α×γ,
  wherein D denotes the step length, k denotes a coefficient, α denotes the luminance parameter, and γ denotes the focal length parameter.

8. The system of claim 1, wherein to determine the step length of the aperture, the at least one processor is further directed to:
  determine the step length based on the exposure parameter and the focal length parameter according to $$D = k \times \frac{\gamma}{\beta},$$

wherein D denotes the step length, k denotes a coefficient, β denotes the exposure parameter, and γ denotes the focal length parameter.

9. The system of claim 1, wherein to determine the step length of the aperture, the at least one processor is further directed to:
  obtain a three-dimensional table including the luminance parameter, the exposure parameter, and the focal length parameter as three coordinate axes of the three-dimensional table; and
  determine the step length based on the three-dimensional table.

10. A method for automatically adjusting an aperture of a camera, comprising:
  obtaining at least two parameters out of three parameters of the camera, the three parameters including a luminance parameter, an exposure parameter, and a focal length parameter;
  determining a step length of the aperture based on the at least two parameters, wherein the determining the step length of the aperture includes:
    determining whether an absolute difference between a current luminance and a target luminance of the camera is greater than a luminance threshold; and
    in response to a determination that the absolute difference is greater than the luminance threshold, determining the step length of the aperture; and
  automatically adjusting the aperture of the camera based on the step length.

11. The method of claim 10 further comprising:
  obtaining a current luminance of the camera;
  obtaining a target luminance of the camera; and
  determining the luminance parameter based on the current luminance and the target luminance.

12. The method of claim 10 further comprising:
  obtaining a current shutter speed of the camera;
  obtaining a current gain of the camera;
  obtaining a maximum shutter speed of the camera;
  obtaining a maximum gain of the camera; and determining the exposure parameter based on the current shutter speed, the current gain, the maximum shutter speed, and the maximum gain.

13. The method of claim 10 further comprising:
obtaining a current focal range of the camera;
obtaining a focal range at a telephoto end of the camera; and
determining the focal length parameter based on the current focal range and the focal range at the telephoto end.

14. The method of claim 10, wherein the determining the step length of the aperture further includes:
determining the step length based on the luminance parameter, the exposure parameter, and the focal length parameter according to $$D = k \times \frac{\alpha \times \gamma}{\beta},$$

wherein D denotes the step length, k denotes a coefficient, α denotes the luminance parameter, β denotes the exposure parameter, and γ denotes the focal length parameter.

15. The method of claim 10, wherein the determining the step length of the aperture further includes:
determining the step length based on the luminance parameter and the exposure parameter according to $$D = k \times \frac{\alpha}{\beta},$$

wherein D denotes the step length, k denotes a coefficient, α denotes the luminance parameter, and β denotes the exposure parameter.

16. The method of claim 10, wherein the determining the step length of the aperture further includes:
determining the step length based on the luminance parameter and the focal length parameter according to
D=k×α×γ,
wherein D denotes the step length, k denotes a coefficient, α denotes the luminance parameter, and γ denotes the focal length parameter.

17. The method of claim 10, wherein the determining the step length of the aperture further includes:
determining the step length based on the exposure parameter and the focal length parameter according to $$D = k \times \frac{\gamma}{\beta},$$

wherein D denotes the step length, k denotes a coefficient, β denotes the exposure parameter, and γ denotes the focal length parameter.

18. The method of claim 10, wherein the determining the step length of the aperture further includes:
obtaining a three-dimensional table including the luminance parameter, the exposure parameter, and the focal length parameter as three coordinate axes of the three-dimensional table; and
determining the step length based on the three-dimensional table.

19. A non-transitory readable medium, comprising at least one set of instructions for automatically adjusting an aperture of a camera, wherein when executed by at least one processor of an electrical device, the at least one set of instructions directs the at least one processor to perform a method, the method comprising:
obtaining at least two parameters out of three parameters of the camera, the three parameters including a luminance parameter, an exposure parameter, and a focal length parameter;
determining a step length of the aperture based on the at least two parameters, wherein the determining the step length of the aperture includes:
determining whether an absolute difference between a current luminance and a target luminance of the camera is greater than a luminance threshold; and
in response to a determination that the absolute difference is greater than the luminance threshold, determining the step length of the aperture; and
automatically adjusting the aperture of the camera based on the step length.

* * * * *